G. N. Doolittle,
Hay Press.
Nº 38,950. Patented June 23, 1863.
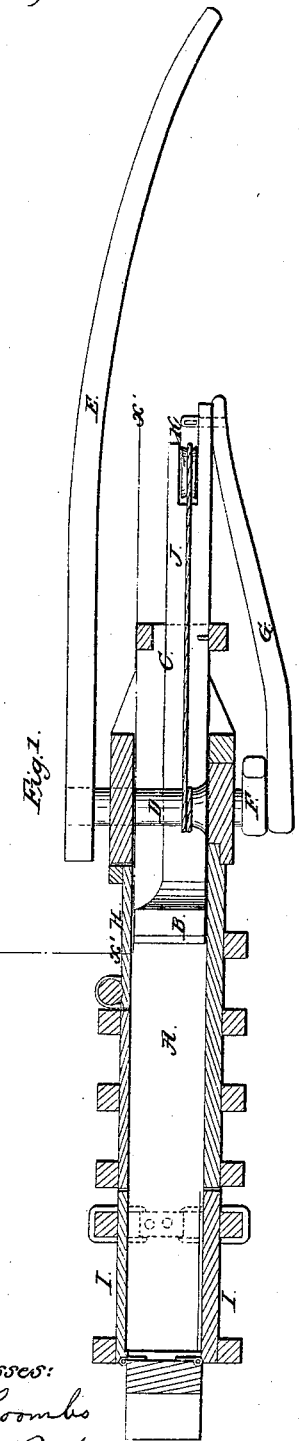
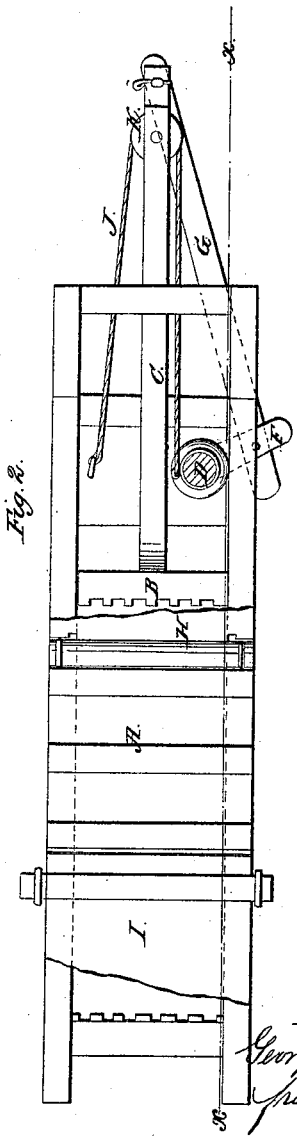

UNITED STATES PATENT OFFICE.

GEORGE N. DOOLITTLE, OF LOUISVILLE, KENTUCKY.

IMPROVEMENT IN HAY AND COTTON PRESSES.

Specification forming part of Letters Patent No. 38,950, dated June 23, 1863.

*To all whom it may concern:*

Be it known that I, GEORGE N. DOOLITTLE, of Louisville, in the county of Jefferson and State of Kentucky, have invented a new and Improved Press for Compressing Hay, Cotton, and other Substances for Baling; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same, partly in section, as indicated by the line $x'\ x'$, Fig. 1.

Similar letters of reference indicate corresponding parts in the figures.

This invention consists in the employment or use of a windlass in connection with a crank and pitman, all being arranged with a plunger and plunger-rod in such a manner that the press-box may be filled with the substance to be baled and properly compacted therein previous to the pressing operation.

To enable those skilled in the art to fully understand and construct my invention, I will proceed to describe it.

A represents a horizontal box, which is designed to be placed on a wagon when used. This box has a plunger, B, fitted within it, the plunger-rod C extending through one end of the box.

D is a vertical shaft which passes through the box A, and has a sweep, E, attached to its upper end, the lower end of said shaft having a crank, F, attached, which is connected by a pitman, G, with the plunger-rod C, as shown clearly in both figures.

H is a door in the upper side of the box A near its open end, and I I are two doors which are placed one in the upper and the other in the under side of the box A at the end opposite to that where the door H is placed.

J is a rope, which is attached at one end to the box A near its open end, and which, when in use, passes around a pulley, K, in the outer end of the plunger-rod C, and is attached to the shaft D.

The operation is as follows: At the commencement of the operation the rope J is detached from the shaft D and withdrawn from the plunger-rod C, and the pitman G is attached to C. The door H is then opened, and a quantity of hay, cotton, or other substance to be compressed is placed in the box, the door H closed and the sweep E turned, by means of a horse, one revolution, the plunger B being thereby moved within the box A a distance equal to twice the length of the crank F. The door H is then again opened, another quantity of hay or cotton put into the box A, and the sweep E turned another revolution. This operation is continued until the box becomes charged or filled with the requisite quantity of hay, cotton, or other material to be compressed. The pitman G is then detached from the crank F and plunger-rod C, the rope J passed around the pulley K and attached to the shaft D, and the sweep E turned, which causes the rope J to be wound upon the shaft D and the plunger B to be forced or shoved within the press-box A, so as to compress the substance within the press-box. The compressed substance is bound by opening the doors I I, and is then discharged from the box, the doors I I closed, the rope J detached from the shaft D, the pitman G attached to the crank F and plunger-rod C, and the operation repeated for a succeeding bale.

The filling of the press-box A by the operation of the crank is an important feature, as it causes the hay or other substance to be firmly compacted within the box before the pressing operation is commenced, and bales of a given weight may be compressed within a box of smaller dimensions than they otherwise could.

Having thus described my invention, what I claim as new, and desire to secure by Letters Patent, is—

The shaft D, passing through the press-box A, and provided at its upper end with a sweep, E, and at its lower end with a crank, F, in combination with a pitman, G, plunger B, and plunger-rod C, and rope J, all arranged in relation with the press-box A, to operate as and for the purpose specified.

GEO. N. DOOLITTLE.

Witnesses:
BIRD RITTERMAN,
B. F. GHORMLEY.